Figure 1:
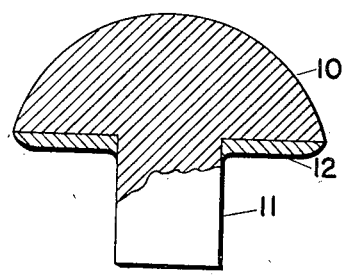

Aug. 10, 1943.  R. B. GRAY  2,326,455
FASTENING MEANS
Filed March 13, 1942

INVENTOR.
REID B. GRAY
BY George Douglas Jones
ATTORNEY

Patented Aug. 10, 1943

2,326,455

UNITED STATES PATENT OFFICE 2,326,455

FASTENING MEANS

Reid B. Gray, Dundalk, Md., assignor to The Glenn L. Martin Company, Middle River, Md., a corporation of Maryland Application March 13, 1942, Serial No. 434,469

7 Claims. (Cl. 85—37)

This invention relates to a fastening means, and more particularly to a rivet which provides a permanent positive sealing means for hulls, tanks, and the like.

It is well known to those skilled in the art that the vibration and strain to which riveted hulls, tanks and the like are subjected cause the rivets to become loose and result in the leaking of the structures. Heretofore, it has been impossible to construct hulls and tanks to overcome this difficulty.

It is, therefore, an object of the present invention to construct the aforementioned structures in such a manner that they will not leak when subjected to vibration and strain.

Another object of the present invention is to construct a rivet coated or lined with a pliable plastic material which will counteract the destructive forces of vibration and strain, resist corrosion, and have low extractive and permeability properties so as to provide a leak-proof fastening means.

Another object of the invention is to provide a pliable plastic washer adapted to cooperate with a fastening means to counteract the destructive forces of vibration and strain to which the fastening means is subject and which will resist corrosion so as to provide a leak-proof fastening means.

The present invention particularly pertains to the forming of rivets coated or lined with a solid flexible pliable plastic having low extractive and permeability properties. The term "solid, flexible plastic" is intended to include materials such as Nylon, which is a solid synthetic linear condensation polymer. Other examples of the type of plastics included in this invention are "Butacite," which is a polyvinyl butanal; "Pliofilm," which is chlorinated rubber; "Saflex," a polyvinyl butayral; and the co-polymer of vinyl acetate and vinyl chloride, which is available in the open market.

It is to be understood that the above is not intended to limit the material to be used, but is merely for the purpose of description, since any resilient material having the above characteristics is within the scope of the present invention.

Figure 4:
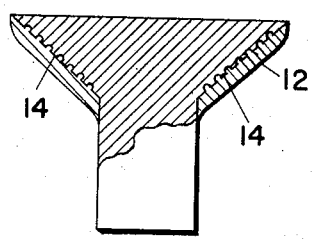
Figure 2:
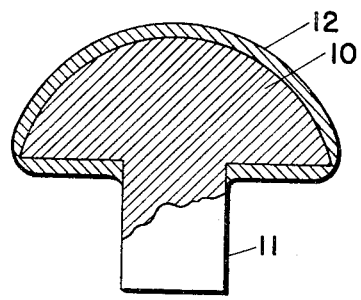
Figure 5:
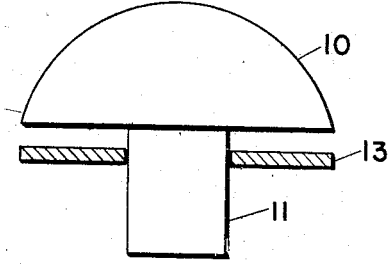
Figure 3:
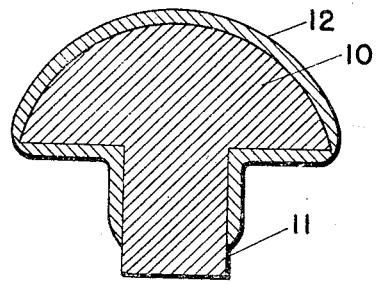

Further objects and advantages of the invention will appear more fully from the following description, particularly when taken in conjunction with the accompanying drawing, wherein like reference numbers refer to like parts, and which form a part hereof:

In the drawing:

Figure 1 is a side elevational view, partly in section, showing the undersurface of the rivet head coated with a pliable plastic or other resilient material as heretofore defined, Figure 2 is a side elevational view, partly in section, showing the head portion of the rivet coated with a plastic as heretofore defined as well as the undersurface thereof, Figure 3 is a sectional view showing the upper surface of the head portion of the rivet coated with a plastic as well as the undersurface thereof and a portion of the shank, Figure 4 is a side elevational view, partly in section, showing the undersurface of the head of a countersunk rivet coated with a plastic, and Figure 5 is a side elevational view of a rivet and a cross-section of a plastic washer to be used in conjunction with the rivet.

Referring to the drawing, and more particularly to Figure 1, 10 represents the head of a rivet having formed integrally therewith a shank portion 11. On the undersurface of the rivet head 10 is a coating or lining 12. Coating or lining 12, as heretofore defined, is composed of a material which will counteract the destructive forces of vibration and strain, resist corrosion, and which has low extractive and permeability properties, all of which characteristics result in a leak-proof fastening means, for when the rivet is riveted into place, the lining 12 abuts against one of the units of the structure which it is adapted to connect so as to form a cushion to absorb the vibration and strain to which the structure is subjected. Likewise, the pliable lining 12 is flowed into any crevices which may be present so as to prevent leakage from or into a hull, fuel tank, or the like.

While Figure 1 shows a rivet with the coating or lining 12 applied to the undersurface of the head of the rivet only, Figure 2 shows a rivet which has been dipped in a pliable plastic with the result that a thin coating of plastic appears on the top surface of the head of the rivet as well as on the undersurface thereof. It has been found that dipping is the most simple means of applying the plastic liner, but it is undesirable to have the liner on the upper surface of the rivet. However, during riveting operations, the thin film or coating appearing on the top surface of the head of the rivet will be dissipated, leaving the plastic liner on the undersurface of the rivet head. Of course, the rivet could be so dipped as to have a bonding of the plastic on a portion of the shank thereof also, as shown in Figure 3.

Figure 4 shows a plastic liner or coating 12 applied to the undersurface of a countersunk rivet head merely to show the adaptability of the present invention to various and sundry types of fastening means. This figure also teaches the use of etching 14 for augmenting the bond between the rivet and plastic liner 12. The purpose of the etching 14 is to roughen the surface to which the liner 12 is to be applied, and naturally the scope of the invention is not limited strictly to etching, but the use of this term is for the sake of convenience only.

Figure 5 shows a modification of the invention wherein the plastic material is not applied to the rivet but consists of an individual plastic washer 13 which is adapted to be slid onto the shank 11 of the rivet so that it will lie flush with the undersurface of the rivet head 10 when the riveting operation is completed.

Thus it will be seen that I have provided a rivet or other fastening means which is unaffected by the vibration and strain inherent in the structure to which it is affixed, for when the rivet is riveted into place, the lining 12 abuts against one of the units of the structure which it is adapted to connect to serve as a cushion to absorb the vibration and strain to which the structure is subjected. Likewise, pliable liner 12 is flowed into any crevices which may be present so as to prevent leakage from or into a hull, fuel tanks, or the like.

It will be obvious that within the scope of the invention many variations are possible in the materials employed and in the manner of applying the material to the rivet. It will also be understood that while the present invention has been described in connection with a rivet the invention is equally well adaptable to various types of fastening means, such as nuts, bolts, washers and the like, and that I do not intend to limit myself thereby, except within the scope of the appended claims.

I claim:
1. In combination, a rivet having a head portion and a shank portion, and a substantially thin coating of a resilient, pliable vinyl polymer synthetic plastic material applied to the underside of the head portion.

2. A rivet having a head and a shank projecting from the said head, the portion of the head adjacent the shank being coated with a thin layer of resilient, pliable plastic material, said material consisting of a co-polymer of the vinyl group.

3. A rivet having a head and a shank projecting from the said head, the portion of the head adjacent the shank having bonded thereto a resilient, plastic material, said material consisting of a polyvinyl aldehyde.

4. In combination, a rivet having a head portion and a shank portion, and a substantially thin coating of a resilient, pliable vinyl polymer synthetic plastic material bonded to the underside of the head portion.

5. A fastening means having a head and a shank projecting from the said head, and a substantially thin coating of pliable vinyl polymer synthetic plastic material applied to the underside of the head portion and along at least a portion of the surface of the shank.

6. A non-ferrous rivet having a head and a shank, the under portion of the head having a roughened surface and a thin coating of resilient, plastic material bonded thereto, said material consisting of a polyvinyl aldehyde.

7. In combination a rivet having a shank and a head portion, a vinyl polymer synthetic washer having rubber-like physical characteristics, of a diameter substantially equal to the diameter of the head portion, positioned under said head portion.

REID B. GRAY.